United States Patent
Dang et al.

(10) Patent No.: US 8,452,008 B2
(45) Date of Patent: May 28, 2013

(54) CONTENT DISTRIBUTING METHOD, APPARATUS AND SYSTEM

(75) Inventors: Ya Bin Dang, Beijing (CN); Ling Shao, Beijing (CN); Feng Bo, Shanghai (CN); Rong Yan, XiSanQi (CN)

(73) Assignee: International Business Machines Corporation, Armonk, NY (US)

( * ) Notice: Subject to any disclaimer, the term of this patent is extended or adjusted under 35 U.S.C. 154(b) by 1356 days.

(21) Appl. No.: 11/766,101

(22) Filed: Jun. 20, 2007

(65) Prior Publication Data
US 2008/0031448 A1    Feb. 7, 2008

(30) Foreign Application Priority Data
Jun. 20, 2006 (CN) .......................... 2006 1 0093075

(51) Int. Cl.
*H04L 29/06* (2006.01)
(52) U.S. Cl.
USPC .............................. 380/200; 380/217; 713/193
(58) Field of Classification Search
USPC .......................... 713/193; 380/200, 210, 217
See application file for complete search history.

(56) References Cited

U.S. PATENT DOCUMENTS

| | | | |
|---|---|---|---|
| 5,712,800 A | 1/1998 | Aucsmith | |
| 6,021,199 A * | 2/2000 | Ishibashi | 380/217 |
| 6,415,031 B1 * | 7/2002 | Colligan et al. | 380/200 |
| 6,636,968 B1 | 10/2003 | Rosner et al. | |
| 7,248,694 B2 | 7/2007 | Husemann et al. | |
| 2002/0062445 A1 * | 5/2002 | Owada et al. | 713/193 |
| 2002/0170053 A1 * | 11/2002 | Peterka et al. | 380/210 |
| 2005/0066355 A1 | 3/2005 | Cromer et al. | |
| 2005/0100161 A1 | 5/2005 | Husemann et al. | |
| 2005/0102506 A1 | 5/2005 | Pica et al. | |

FOREIGN PATENT DOCUMENTS

| | | |
|---|---|---|
| CN | 1649412 A | 8/2005 |
| WO | WO/03051056 A1 | 6/2003 |

OTHER PUBLICATIONS

E. Masala, "MAC-Level Partial Checksum for H.264 Video Transmission over 802.11 Ad Hoc Wireless Networks", Jun. 1, 2005, IEEE 0-7803-8887-9.*

(Continued)

*Primary Examiner* — Jeffrey Pwu
*Assistant Examiner* — Thong Truong
(74) *Attorney, Agent, or Firm* — Fleit Gibbons Gutman Bongini & Bianco PL; Thomas Grzesik (57) ABSTRACT

The present invention provides a method of distributing content to a plurality of clients. The method on a server begins with accessing content to be distributed to a plurality of clients and identifying a first type of content to be distributed as crucial content and identifying a second type of content to be distributed as non-crucial content. The crucial content is any content required to properly render, after a decryption process, the content. The non-crucial content is all the other content to be distributed. The crucial content is encrypted with a first encrypting key which is unique to each of the plurality of clients. The crucial content which has been encrypted is transmitted. The non-crucial content is transmitted to the plurality of clients.

20 Claims, 7 Drawing Sheets

OTHER PUBLICATIONS

Chiou, Guang-Huei, et al, "Secure Broadcasting using the Secure Lock", IEEE Transactions on Software Engineering, vol. 15 No. 8 Aug. 1989, pp. 929-934.

Du, Xinjun, et al., "An ID-Based Broadcast Encryption Scheme for Key Distribution", IEEE Transactions on Broadcasting, vol. 51, Issue 2, Jun. 2005, pp. 1-15.

Lin, C.H., et al., "A Conference Key Broadcasting System Using Sealed Locks", Information Systems vol. 17, No. 4, pp. 323-328, 1992, Pergamon Press Ltd.

Zhang, "Content Protection System With Public Key for Video-on-Demand" Technical Disclosure, IP.com PriorArtDatabase, IP.com No. IPCOM000015596D, original publication date: Mar. 24, 2002, pp. 1-5.

* cited by examiner

CONTENT DISTRIBUTING METHOD, APPARATUS AND SYSTEM

FIELD OF THE INVENTION

The present invention generally relates to the field of communication system and, more particularly, to a method and an apparatus of distributing content to a plurality of receivers.

BACKGROUND OF THE INVENTION

Content distribution with digital right management (DRM) is available using multicast and broadcast content distribution. Each client or receiver in a subscription-based content distribution system receives the same protected content. DRM systems reduce the unauthorized access to content so as to prevent clients that have not subscribed to the content from illegally obtaining it.

Typically, a measure to protect content in the prior art is to use common keys which are known by all clients to encrypt content in a server (sender) distributing the content, so that each client will normally use the received content after decrypting the received content with the common keys. Then, a problem arises: since the content is directed to all authorized clients, a malicious attack and the like on any authorized client will cause exposure of the common keys of all authorized clients, and then an illegal client will be easy to obtain the content which the server distributes to a plurality of authorized clients by using the exposed common key with ease.

To eliminate the above problem caused by common keys, other systems use a public key exchange solution. In this solution, a server generates and stores a key that is unique to each client in accordance with public keys provided by the clients respectively. When sending some content, the server encrypts the content with the key unique to a client that will receive the content. Only with the corresponding key, can the client decrypt the content for use upon receipt of the content. In such a case, even if other clients have received the content, they still cannot decrypt the content for lack of the corresponding private key. In a content sending/receiving system based on this solution, even if a key that is unique to a authorized client is exposed due to a malicious attack on the client, contents that have been sent to other clients are prevented from authorized use, as only the content of the attacked client can be decrypted with the exposed private key. However, a serious problem caused by this solution is that even if there is a plurality of clients receiving the same content, the server respectively encrypts the same content with each client's specific key and sends the same content in order. This greatly increases the burden on the system's processing time and storage resources.

To reduce the burden on system resources, U.S. Pat. No. 6,636,968 describes another solution. In this solution, a server creates a uniform session key using public keys sent by all authorized clients and the server's own key, to perform uniform encryption of content. At the same time, the server creates group key and partial keys for decryption and sends these keys out. Only when a client that has received the encrypted content combines the group key, the partial key and its specific private key to create a decryption key for decrypting the content, can the client decrypt the received content. By using such a solution that the uniform session key is combined with the private key, an authorized client is prevented from obtaining content distributed to other clients after a malicious attack on a certain authorized client, and the content only needs to be encrypted once in case that a plurality of clients share the same content. However, the multiple keys (public keys at clients, public pair keys and partial keys) exchange in this solution will increase the network's transmission amount, compound the content distributing solution and raise the implementation costs.

According what is needed is a method and system to over come the problems encountered in the prior art and to reduce the amount of network transmission required.

SUMMARY OF THE INVENTION

The present invention overcomes the above deficiencies in the prior art by providing a simple and easily realizable content distributing method, apparatus, content receiving method and apparatus as well as content distributing system capable of reducing the influence of malicious attacks.

The present invention provides a method of distributing content to a plurality of receivers, comprising the steps of: obtaining content to be distributed; determining crucial content and non-crucial content in said content to be distributed; sending said crucial content to each of said plurality of receivers in a protection way that is unique to the receiver; and sending said non-crucial content to said plurality of receivers.

In the above method, said step of sending said non-crucial content to said plurality of receivers comprises the step of sending said non-crucial content to said plurality of receivers in a protection way that is common to said plurality of receivers.

In the above method, said step of sending said crucial content to the receiver in a protection way that is unique to the receiver comprises the steps of: determining the receiver's specific key; encrypting said crucial content using said specific key; and sending said encrypted crucial content to the receiver.

In the above method, said step of determining the receiver's specific key comprises the step of transmitting said specific key to the receiver by using an asymmetric encryption algorithm.

In the above method, said step of sending said non-crucial content to said plurality of receivers in a protection way that is common to said plurality of receivers comprises the steps of: determining common keys of said plurality of receives; encrypting said non-crucial content using said common keys; and sending said encrypted non-crucial content to said plurality of receivers.

In the above method, said crucial content can be sent on a uni-cast channel established for the receiver, and said non-crucial content can be sent on a multicast channel established for said plurality of receivers.

The present invention further provides a method of receiving content at a receiver, comprising the steps of: receiving crucial content, said crucial content being sent to said receiver in a protection way that is unique to said receiver; receiving non-crucial content; and combining said crucial content with said non-crucial content as content received by said receiver.

In the above method, said non-crucial content is sent to a plurality of receivers including said receiver in a protection way that is common to said plurality of receivers.

In the above method, said step of receiving non-crucial content comprises the step of decrypting said received encrypted crucial content using said receiver's specific key.

The above method further comprises the step of obtaining said specific key from a sender of said crucial content by using an asymmetric encryption algorithm.

In the above method, said step of receiving non-crucial content further comprises the step of decrypting said received encrypted non-crucial content by using common keys of said plurality of receivers.

In the above method, said crucial content can be received on a uni-cast channel established for said receiver, and said non-crucial content can be received on a multicast channel established for said plurality of receivers.

The present invention further provides an apparatus of distributing content to a plurality of receivers, comprising: content to be distributed obtaining means for obtaining content to be distributed; crucial content determining means for determining crucial content and non-crucial content in said content to be distributed; a crucial content sender for sending said crucial content to each of said plurality of receivers in a protection way that is unique to the receiver; and a non-crucial content sender for sending said non-crucial content to said plurality of receivers.

In the above apparatus, said non-crucial content sender sends said non-crucial content to said plurality of receivers in a protection way that is common to said plurality of receivers.

The above apparatus further comprises crucial content encrypting means for, with respect to each of said plurality of receivers, encrypting said crucial content by using the receiver's specific key so that said encrypted crucial content will be sent by said crucial content sender.

The above apparatus further comprises means for transmitting to each of said plurality of receivers a specific key thereof by using an asymmetric encryption algorithm.

The above apparatus further comprises non-crucial content encrypting means for encrypting said non-crucial content by using common keys of said plurality of receivers, so that said encrypted non-crucial content will be sent by said non-crucial content sender.

In the above apparatus, said crucial content sender can send said crucial content on a uni-cast channel of each of the receivers, and said non-crucial content sender can send said non-crucial content on a multicast channel of said plurality of receivers.

The present invention further provides an apparatus of receiving content at a receiver, comprising: a crucial content receiver for receiving crucial content, said crucial content being sent to said receiver in a protection way that is unique to said receiver; a non-crucial content receiver for receiving non-crucial content; and content combining means for combining said crucial content with said non-crucial content as content received by said receiver.

In the above apparatus, said non-crucial content is sent to a plurality of receivers including said receiver in a protection way that is common to said plurality of receivers.

The above apparatus further comprises crucial content decrypting means for decrypting content received by said crucial content receiver using said receiver's specific key.

The above apparatus further comprises means for obtaining said specific key from a sender of said crucial content by using an asymmetric encryption algorithm.

The above apparatus further comprises non-crucial content decrypting means for decrypting content received by said non-crucial content receiver by using common keys of said plurality of receivers.

In the above apparatus, said crucial content receiver can receive said crucial content on a uni-cast channel established for said receiver, and said non-crucial content receiver can receive said non-crucial content on a multicast channel established for said plurality of receivers.

The present invention further provides a content distributing system, comprising an apparatus of distributing content to a plurality of receivers as described above and at least one apparatus of receiving content at a receiver as described above.

With the method and apparatus of distributing content to a plurality of receivers and the content distributing system of the present invention, impact that may occur to the whole system during malicious attack on a client can be effectively reduced, the transmission bandwidth can be adjusted flexibly in accordance with needs, the transmission efficiency can be enhanced, and the communication system performance can be improved accordingly.

The foregoing and other features and advantages of the present invention will be apparent from the following more particular description of the preferred embodiments of the invention, as illustrated in the accompanying drawings.

BRIEF DESCRIPTION OF THE DRAWINGS

The foregoing and additional advantages of the present invention will become more apparent with reference to the accompanying drawings taken in conjunction with the following description in which.

DESCRIPTION OF THE PREFERRED EMBODIMENTS

It should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality.

Hereinafter is the detailed description, taken in combination with the accompanying drawings, of the embodiments of the present invention.

Figure 1:
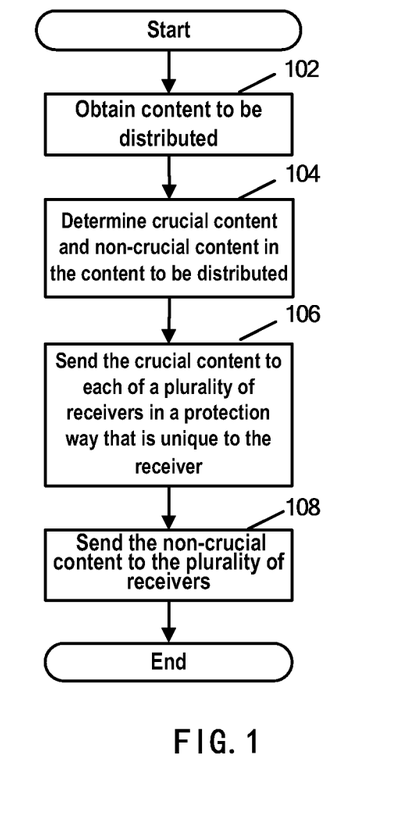
FIG. 1 is a flowchart of a method of distributing content to a plurality of receivers in accordance with an embodiment of the present invention.

FIG. 1 is a flowchart of a method of distributing content to a plurality of receivers in accordance with an embodiment of the present invention.

As shown in FIG. 1, after the flow starts, content to be distributed is obtained in step 102.

The content to be distributed is, for example, multimedia material of a provided service, and may include various forms, such as video, audio and/or data. In the following respective embodiments, well-known video content is used as the content to be distributed. However, it is important to note that other forms of the content to be distributed do not constitute limitations on the present invention.

In step 104, crucial content and non-crucial content of the content to be distributed is determined.

The criterion for distinguishing the crucial content from non-crucial content will be described below. Crucial content generally has the following effects:

(1) lacking the crucial content leads to an unusable content; or (2) lacking the crucial content leads to too heavy degradation in content usage quality to severely influence the user experience of received content which a user on client.

Additionally, the proportion of the crucial content to the entire content to be distributed is usually made as small as possible.

The non-crucial content is the part of the content to be distributed other than the crucial content.

The above criterion for distinguishing the crucial content from non-crucial content is not in absolute terms. Actually, distinguishing of the crucial content from the non-crucial content is relatively flexible, which may take into comprehensive consideration of the system's processing capability, transmission bandwidth and the user experience of received content on a client. That is to say, not all content that meets any one of the conditions as listed above will be necessarily determined as crucial content, and not all content that does not meet the conditions as listed above will be necessarily determined as non-crucial content. Flexible determination of the crucial content and non-crucial content enables the transmission bandwidth to be conveniently adjusted. In the following, determination of the crucial content and non-crucial content will be explained in greater detail by taking video stream content as an example.

Next, in step 106, the crucial content is sent to each of the plurality of receivers in a protection way that is unique to the receiver.

Here, "way that is unique to the receiver" means that the crucial content to be sent are protected in different protection ways corresponding to respective receivers before the crucial content is sent to the plurality of receivers.

There may be multiple protection ways, such as encryption protection way of encrypting content to be sent, channel protection way of sending content over a uni-cast (dedicated) channel and the like. Different protection ways do not constitute limitations on the present invention.

In case of encryption protection way, a specific key is determined for each of the receivers (i.e., this receiver's specific key is different from specific keys of other receivers), and the crucial content is encrypted using the receiver's specific key, and then the encrypted crucial content is sent to the receiver in step 106 that must be performed for each of the receivers.

Each of the receivers and the content distributor may reach an agreement on the receiver's specific key in advance. The specific key of a receiver may be simply set as the client's innate codes (such as machine codes, MAC address or main board ID) or may be created by the content distributor and transmitted to the receiver with asymmetric encryption algorithm.

In case of channel protection way, a separate uni-cast (dedicated) channel may be established for each of the receivers and the crucial content is sent over the uni-cast (dedicated) channel for each receiver in step 106.

The above encryption protection way may be used in conjunction with the above channel protection way. For example, in step 106, a specific key may be determined for each of the receivers (i.e., the receiver's specific key is different from specific keys of other receivers), and the crucial content is encrypted using the receiver's specific key, and then the encrypted crucial content is sent over the uni-cast (dedicated) channel established for the receiver.

Regardless of protection way, the effects achieved by step 106 are as follows: in case of any malicious attack on a certain receiver, such as exposure of the common keys (as described in the following) of the plurality of receivers including this receiver or a multicast port address created for the plurality of receivers, the attacker client can only obtain the non-crucial content without the crucial content, so that the user experience of the distributed content that the attacker has is greatly degraded.

After step 106, the flow proceeds to step 108.

In step 108, the non-crucial content is sent to the plurality of receivers.

Optionally, the non-crucial content may be sent to the plurality of receivers in a protection way that is common to the plurality of receivers in step 108.

Here, "protection way that is common to the plurality of receivers" means that the same protection way is utilized for the non-crucial content for the plurality of receivers.

Also, there may be multiple protection ways for the non-crucial content, such as encryption protection way of encrypting the non-crucial content with the same keys for the plurality of receivers (i.e. the common keys for the plurality of receivers), or channel protection way of sending the non-crucial content over a multicast (broadcast) channel for the plurality of receivers and the like. The encryption protection way may be used in conjunction with the channel protection way. Different protection ways do not constitute limitations on the present invention.

The above steps 102 to 108 may be performed in a cycle for streaming media. In case there is no content available for distribution, the flow may wait or end.

In one embodiment of the present invention, a difference between the flowchart as shown in FIG. 1 and existing technical solutions is that in the prior art content to be distributed is encrypted in its entirety, while in FIG. 1 content to be distributed is divided into crucial content and non-crucial content which are handled in different ways. Specifically, different protection ways are provided for crucial content for different receivers, while the same protection way is provided for non-crucial content for different receivers, or no protection is provided for non-crucial content.

Figure 2:
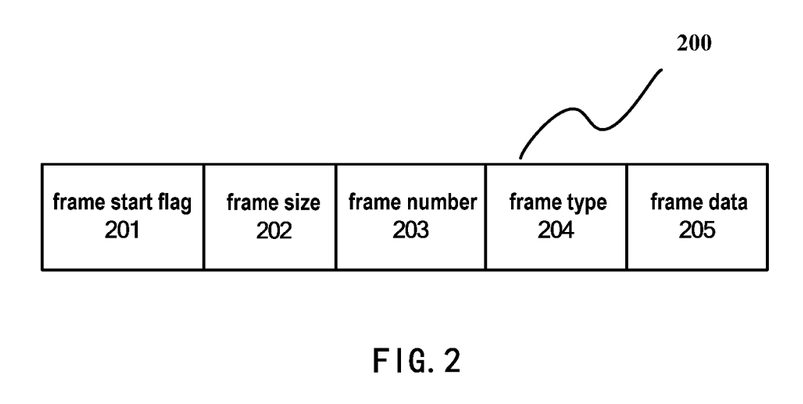
FIG. 2 is an exemplary frame structure of content to be distributed in an embodiment of the present invention.

FIG. 2 is an exemplary frame structure of content to be distributed in an embodiment of the present invention, which is an MPEG-4 frame structure. MPEG-4, a compression standard developed by the Moving Picture Expert Group based on the $2^{nd}$-generation video-audio coding technology, takes audio-visual media object as basic unit, serves to integrate digital video-audio with graphic synthesis applications and interactive multimedia and has been put into applications in the fields of streaming media service and the like.

As shown in FIG. 2, a frame 200 comprises: a frame start flag field 201, a frame size field 202, a frame number field 203, a frame type field 204 and a frame data field 205. Among them, the frame start flag field 201 denotes the start of a frame and occupies a space of 4 bytes;

the frame size field 202 denotes the size of an entire frame, namely the overall size of the above five fields, and occupies a space of 4 bytes;

the frame number field 203 denotes the sequence number of a frame and occupies a space of 4 bytes;

the frame type field 204 denotes the type of a frame (I frame, P frame or B frame) and occupies a space of 1 byte; and the frame data field 205 is used for storage of complete data of a compressed frame.

I frame is a key frame which is the first frame constituting a frame group (GOP). I frame retains all information of a scenario.

P frame is a future unidirectional predicative frame which only stores a difference with the previous decompressed picture.

B frame is a bidirectional predicative frame which refers to both the preceding decompressed picture and picture information of the following frame.

Therefore, during the process of distributing to the plurality of receivers content that uses the frame structure as shown in FIG. 2, frames which the frame type fields 204 indicate as I frames may be determined as crucial content, and frames which the frame type fields 204 indicate as P frames or B frames may be determined as non-crucial content.

Figure 3:
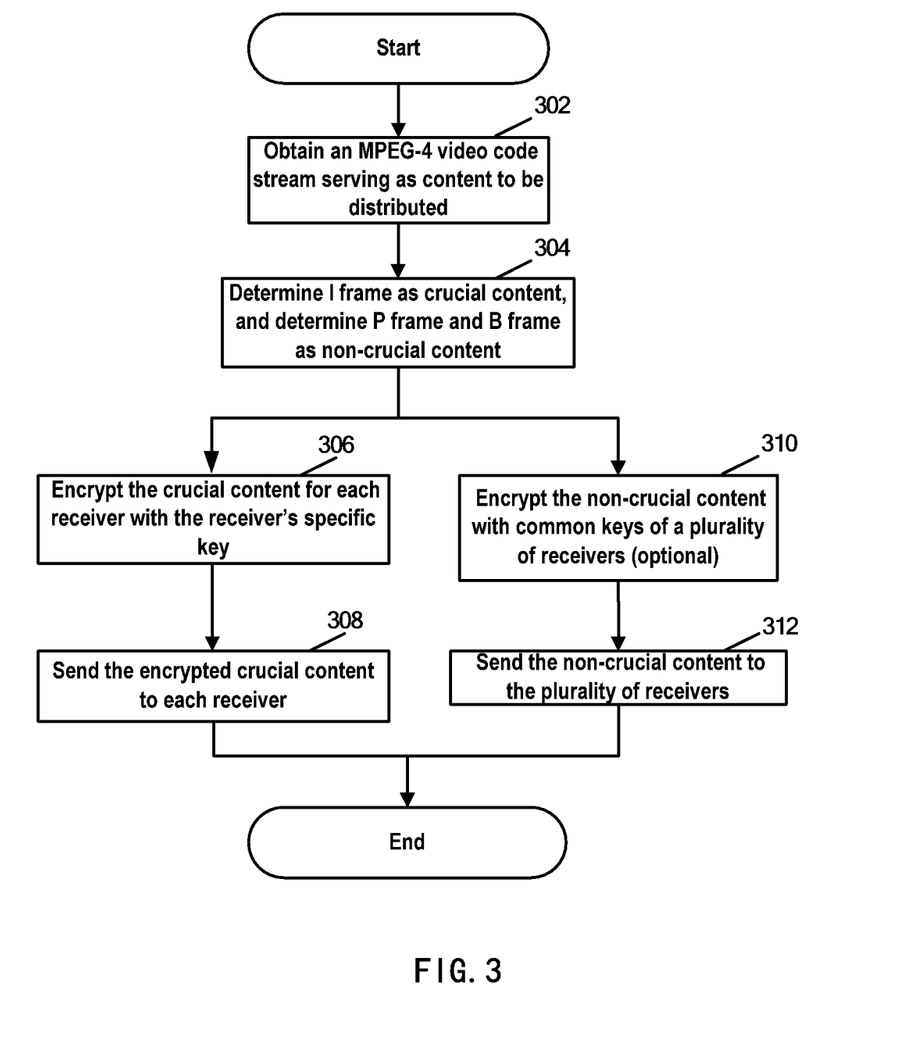
FIG. 3 is a flowchart of a method of distributing MPEG-4 video content to a plurality of receivers in accordance with an embodiment of the present invention.

FIG. 3 is a flowchart of a method of distributing MPEG-4 video content to a plurality of receivers in accordance with an embodiment of the present invention.

As shown in FIG. 3, after the flow starts, MPEG-4 video code stream serving as the content to be distributed is obtained in step 302.

The MPEG-4 frame structure is as shown in FIG. 2. Content of the MPEG-4 frame structure is a type of prediction+transformation+entropy coding video content. According to the definition of MPEG-4 frame structure, the MPEG-4 frames bearing such kind of video content comprise frames necessary to content decoding—video frames capable of independently being decoded, namely I frames (usually in a relatively small number), and frames unnecessary to decoding—video frames incapable of independently being decoded, namely P frames and B frames. During the process of decoding, the quality of the restored video content will be severely degraded or even the video content cannot be restored without I frame.

Next, I frames are determined as crucial content and the P frames and B frames are determined as non-crucial content in step 304.

Afterwards, the crucial content is encrypted for each of the receivers with the receiver's specific key in step 306.

Any known encryption algorithm like symmetric encryption algorithm or asymmetric encryption algorithm may be utilized. For example, the symmetric encryption algorithm is utilized for encrypting the crucial content (i.e. the I frames) while the asymmetric encryption algorithm is utilized for transmitting the keys to the receivers that are used in the above symmetric encryption algorithm, out of consideration for encryption costs and security degree. Here, the asymmetric encryption algorithm may utilize, for example, a public key infrastructure (PKI) key pair. The keys used in the symmetric encryption algorithm may also be determined through prior negotiation between the server and each of the clients (receivers) and be stored in the server and each of the clients.

In order to prevent each client's specific key from being exposed in the process of exchange between the server and the client, any known key distribution method may be utilized. An exemplary key distribution method comprises the following three steps:

(1) distributing a certificate bound to the client and its public-private key pair using the PKI mechanism;

(2) prior to content distribution, exchanging the certificates between the client and the server end and verifying the validity of each other; and (3) creating, through negotiation, symmetric keys used to encrypt the crucial content.

PKI, a basis for building security of the whole key system in this kind of solutions, consists of following basic components, such as public-key crypto technology, digital certificate, certificate authority (CA) and security policy related to public keys and the like, and serves to ensure security of network communication using public key technology.

A possible symmetric key exchange mechanism may adopt a method similar to SSL. The concrete method is described as follows:

In the initialization stage of communication, the client first sends a ClientHello message, and the server returns a ServerHello message. These two messages are used for negotiating the security capability of the two parties, which includes protocol version, session ID, key exchange algorithm, symmetric encryption algorithm, compression algorithm and more.

Then, the server should send a server certificate (including the server's public key and the like). If the server requests to verity the client, then a CertificateRequest message should be sent. Finally, the server sends a ServerHelloDone message to indicate the end of the hello stage. And then the server waits for a response from the client.

If the server requests to verify the client, the client first sends a Certificate message and then creates a session key, encrypts it with the server's public key and encapsulates it into a ClientKeyExchange message. If the client has sent its own certificate, then it sends a digital signature CertificateVerify message to verify the certificate. Subsequently, the client sends a ChangeCipherSpec message to notify the server that messages to be sent later will be encrypted with security parameters that have been negotiated in advance. Finally, an encrypted Finish message will be sent.

Upon receipt of the above two messages, the server sends its own ChangeCipherSpec message and Finish Message.

Up to this point, hand shaking stage finishes, and the two parties can begin to transmit application data.

Encryption techniques such as DES, MD5 have been utilized in SSL hand shaking content to achieve confidentiality and data integrity, and the digital certificate X.509 is utilized to achieve authentication.

After step 306, the flow proceeds to step 308.

In step 308, the encrypted crucial content is sent to each of the receivers. A uni-cast (one-to-one sending) channel or a multicast or broadcast channel can be utilized.

On the other hand, the non-crucial content (i.e. P frame and B frame) is encrypted using the common keys of the plurality of receivers in step 310. Since the non-crucial content is not important in comparison with the crucial content, step 310 is optional.

Likewise, any known encryption algorithm may be used in step 310, such as the symmetric encryption algorithm or the asymmetric encryption algorithm. It is worth noting that the common keys used for encrypting the non-crucial content in step 310 are the same to the plurality of receivers.

Subsequently, the non-crucial content is sent to the plurality of receivers in step 312. The encrypted/unencrypted non-crucial content may be sent via a multicast (broadcast) channel for the plurality of receivers.

The above steps 302 to 312 may be performed in a cycle for streaming media. In case there is no content available for distribution, the flow may wait or end.

It should be understood that the above physical layer medium used for transmitting the encrypted crucial content and the encrypted/unencrypted non-crucial content may use Ethernet, optical fiber, asymmetric digital subscriber line (ADSL), coaxial cable or radio signals. The transmission layer protocol may use the Transmission Control Protocol/the Internet Protocol (TCP/IP). The application layer protocol may use the Real-time Transport Protocol (RTP). RTP is a network protocol used for processing multimedia data streams on the Internet, with which real-time transmission of streaming media data can be achieved in uni-cast or multicast network environment. Typically, RTP utilizes the User Datagram Protocol (UDP) to transmit multimedia data, whereas it may also use other protocols like TCP or Asynchronous Transfer Mode (ATM) when necessary.

The ISMA/ISMACryp Standard of the Internet Steaming Media Alliance uses RTP as the application layer protocol for basic media streams. An exemplary transmission mode is to one-to-one transmit encrypted crucial content using TCP in ISMACryp compatible encapsulation form, namely uni-cast. Encrypted/unencrypted non-crucial content is one-to-multiple transmitted using UDP in ISMA standard-compatible encapsulation form, namely multicast or broadcast.

Figure 4:
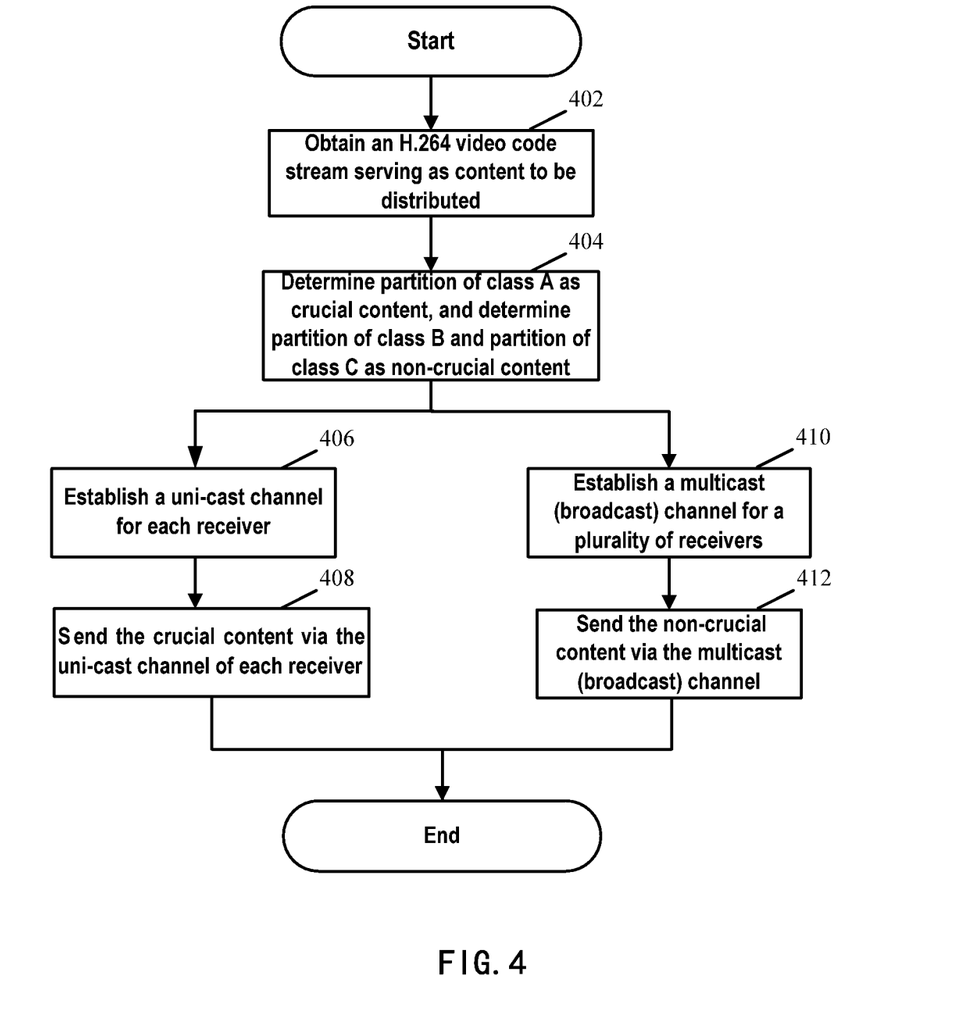
FIG. 4 is a flowchart of a method of distributing H.264 video content to a plurality of receivers in accordance with an embodiment of the present invention.

FIG. 4 is a flowchart of a method of distributing H.264 video content to a plurality of receivers according to an embodiment of the present invention.

H.264 is the latest MPEG compression technique, and related standards are being designed by ITU-T (International Telecommunication Union Telecommunication Standardization Sector) responsible for standardization of communication technologies in cooperation with ISO (International Organization for Standardization). H.264 is also termed MPEG4 AVC (Advanced Video Coding). Content in H.264 format is also a type of video content of prediction+transformation+entropy coding. If the network adaptive layer (NAL) compatible transmission format of H.264 is adopted, video content is divided into three partitions, in which partition of class A contains header information and relevant modes of all slices, which is the most important information in slices, (2) partition of class B contains intra-frame coding macroblocks and motion vectors of inter-frame coding, and (3) partition of class C contains residual of inter-frame coding macroblocks.

As shown in FIG. 4, after the flow starts, H.264 video code stream serving as the content to be distributed is obtained in step 402.

In step 404, partition of class A is determined as crucial content, and partition of class B and partition of class C are determined as non-crucial content.

Then, a uni-cast (dedicated) channel is established for each of the receivers in step 406. And then in step 408 the crucial content (i.e. partition of class A) is sent via the uni-cast (dedicated) channel for each of the receivers.

Here, the uni-cast channel separately established for each of the receivers can provide sufficient protection for the crucial content, and thus the crucial content may be sent on the uni-cast channel in plain text form.

On the other hand, a multicast (broadcast) channel is established for the plurality of receivers in step 410. Then, the non-crucial content (i.e. partition of class B and partition of class C) is sent via the multicast (broadcast) channel in step 412. Here, the non-crucial content may also be sent on the multicast (broadcast) channel in plain text form.

The above steps 402 to 412 may be performed in a cycle for streaming media. In case there is no content available for distribution, the flow may wait or end.

How to determine crucial content and non-crucial content from the content to be distributed has been described by taking video code stream as an example and with reference to FIGS. 3 and 4. Those skilled in the art may understand that crucial content and non-crucial content may also be determined from content to be distributed of other types in accordance with the relation between frames or the frame type of the content to be distributed. In a word, different forms and formats of the content to be distributed and the basis for determining crucial content and non-crucial content do not constitute limitations on the present invention.

Figure 5:
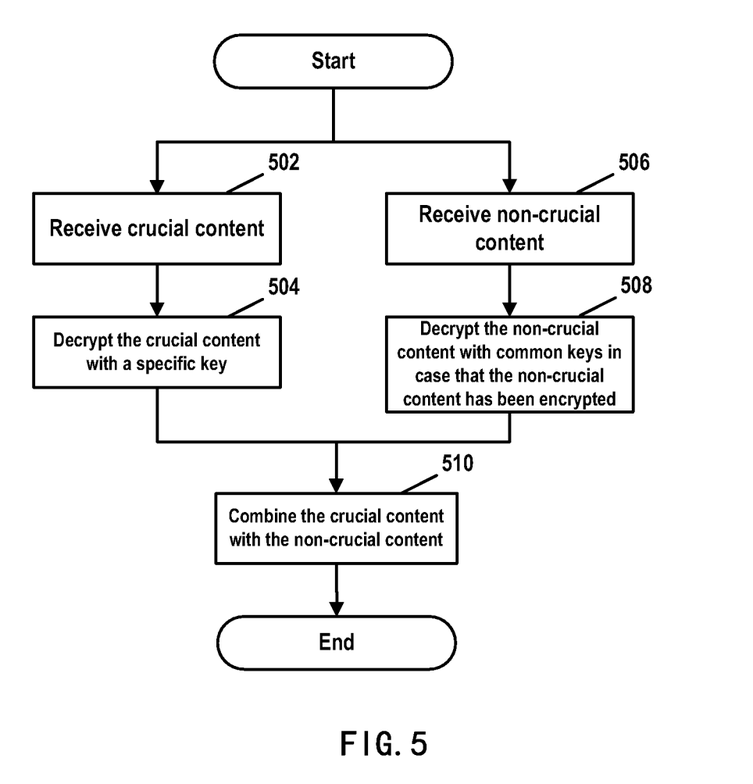
FIG. 5 is a flowchart of a method of receiving content in accordance with an embodiment of the present invention.

FIG. 5 is a flowchart of a method of receiving content according to an embodiment of the present invention. The flow as shown in FIG. 5 may be performed at a receiver client.

As shown in FIG. 5, after the flow starts, crucial content is received in step 502. Then, the crucial content is decrypted with the receiver's specific key in step 504.

It should be noted here that if the crucial content is received from a uni-cast channel and is not encrypted in step 502, then step 504 does not need to be performed. This is because according to the foregoing description taken in conjunction with FIGS. 1, 3 and 4, a uni-cast channel has provided sufficient protection for content sent thereon.

That is to say, the function of steps 502 and 504 is to correctly and securely receive the crucial content on condition that the crucial content is protected in the receiver's specific protection way. The protection way mentioned here is the same as the foregoing description of protection way taken in conjunction with FIGS. 1, 3 and 4.

On the other hand, non-crucial content is received in step 506. The non-crucial content may be received from a multicast or broadcast channel. Here, if the non-crucial content is received from a multicast channel, then this multicast channel is pre-established for the plurality of receivers including this receiver, so that content sent on the multicast channel is protected in common protection way for the plurality of receivers including this receiver.

Another way of protecting the non-crucial content is to encrypt the non-crucial content using the above common keys of the plurality of receivers and then to send it. If the non-crucial content has been encrypted, then the non-crucial content is decrypted using the common keys of the plurality of receivers in step 508.

Next, in step 510, the crucial content is combined with the non-crucial content as content received by the receiver. In the step of combining the crucial content with the non-crucial content, consideration should be given to synchronization between the crucial content and the non-crucial content.

In an embodiment of the present invention, the Real-time Transport Protocol (RTP) is utilized. RTP, a transmission protocol for multimedia data streams on the Internet, was promulgated by the Internet Engineering Task Force (IETF) as RFC1889 and was defined to work under one-to-one or one-to-multiple transmission situations. According to RTP, media streams of the same type may be sorted and combined in accordance with sequence numbers, and media streams of different types may be synchronized using time stamps. A design object of RTP is to extract time stamp content during real-time data transmission and synchronization function of respective data streams. Thus, RTP utilizes the provided sequence number field to enable the client to determine whether there is packet loss through detecting the sequence number of a received packet, and the sequence of packets upon transmission can be restored; RTP provides the time stamp field to re-establish time sequence of audio and video and helps the client to determine consistency or variation of arrival time of data; additionally, RTP provides the synchronization source identifier (SSRC) field to group and replay packets at the client. Consequently, upon receipt of an IP packet, the client first analyzes the RTP header to determine validity of information like version, length, load type and update RTP content in the buffer area, such as the number of received bytes, the number of received video frames, the number of received packets, the number of received sequence numbers and other information, so as to synchronize signal source based on RTP time stamps, sequence numbers of packets and the like arrange RTP packet order and re-construct video frames; and finally, the client performs decoding in accordance with the load type identifier and stores data to the buffer to be decoded and output by the decoder.

The flow ends after step 510. Upon receipt of the content in accordance with the flow as shown in FIG. 5, the receiver can decode, replay or perform other operation on the content to experience the received content by himself (herself).

Figure 6:
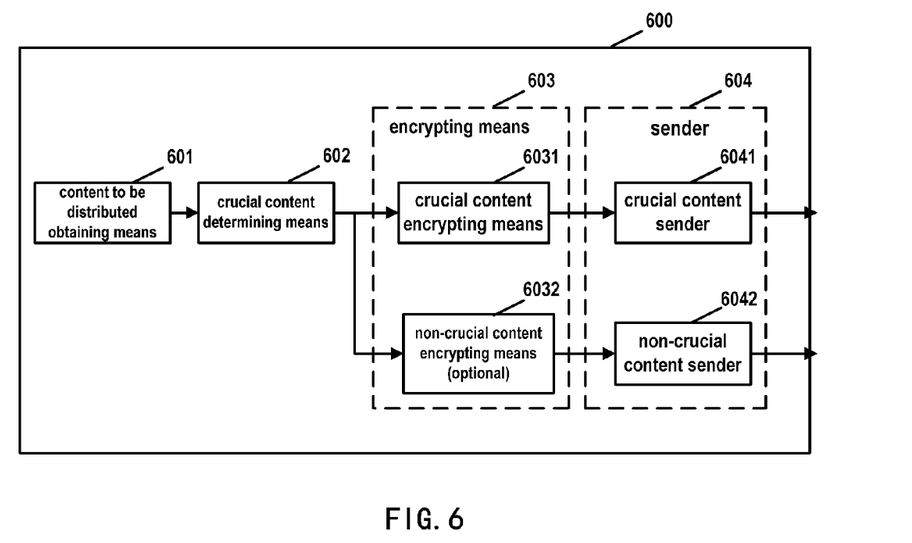
FIG. 6 is a schematic structure of an apparatus of distributing content to a plurality of receivers in accordance with an embodiment of the present invention.

FIG. 6 is a schematic structure of an apparatus of distributing content to a plurality of receivers according to an embodiment of the present invention.

As shown in FIG. 6, a content distributing apparatus 600 comprises: content to be distributed obtaining means 601, crucial content determining means 602, an encrypting means 603 and a sender 604. The encrypting means 603 comprises crucial content encrypting means 6031 and non-crucial content encrypting means 6032. The sender 604 comprises a crucial content sender 6041 and a non-crucial sender 6042.

The content to be distributed obtaining means 601 is used for obtaining content to be distributed which is the same as the content to be distributed previously described with reference to FIGS. 1 to 5.

The crucial content determining means 602 is used for determining crucial content and non-crucial content in the content to be distributed. A criterion for determining crucial content and non-crucial content is as previously described with reference to FIG. 1.

The crucial content sender 6041 sends crucial content to each of plurality of receivers in a protection way that is unique to the receiver. Here, the protection way that is unique to the receiver is the same as that previously described in step 106 with reference to FIG. 1.

The non-crucial content sender 6042 is used for sending non-crucial content to the plurality of receivers. Optionally, the non-crucial content sender 6042 may protect non-crucial content in a protection way that is common to the plurality of receivers when sending the non-crucial content. Here, the protection way that is common to the plurality of receivers is the same as that previously described in step 108 with reference to FIG. 1.

In case that crucial content is protected in an encryption protection way, the crucial content encrypting means 6031 encrypts crucial content for each of the plurality of receivers by using the receiver's specific key, and the encrypted crucial content is then to be sent by the crucial content sender 6041. In this case, the content distributing apparatus 600 may further comprise means for transmitting to each of the plurality of receivers the receiver's specific key by using the asymmetric encryption algorithm (not shown in the figure).

In case that crucial content is protected in a channel protection way, the crucial content encrypting means 6031 may not be provided, and the crucial content sender 6041 establishes a separate uni-cast (dedicated) channel for each of the receivers and sends crucial content on the uni-cast (dedicated) channel of each of the receivers.

The non-crucial content encrypting means 6032 is optional, as non-crucial content is not important in comparison with crucial content and does not need to be protected.

In case that non-crucial content is protected in an encryption protection way, the non-crucial content encrypting means 6032 encrypts non-crucial content with the common keys for the plurality of receivers, and then the encrypted non-crucial content is sent by the non-crucial content sender 6042.

In case that non-crucial content is protected in a channel protection way, the non-crucial content encrypting means 6032 may not be provided, and the non-crucial content sender 6042 establishes a multicast channel for the plurality of receivers and sends non-crucial content on the broadcast channel.

Figure 7:
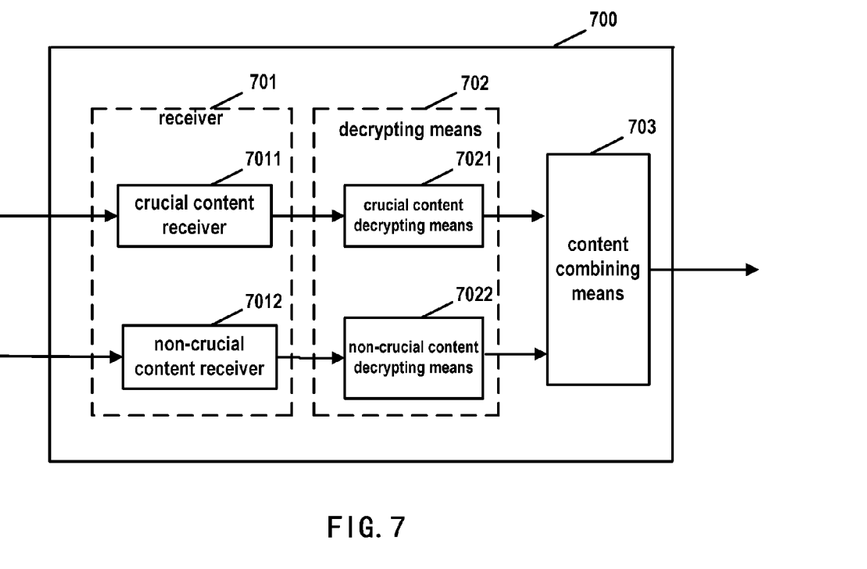
FIG. 7 is a schematic structure of an apparatus of receiving content in accordance with an embodiment of the present invention.

FIG. 7 is a schematic structure of an apparatus of receiving content according to an embodiment of the present invention.

As shown in FIG. 7, a content receiving apparatus 700 comprises: a receiver 701, decrypting means 702 and content combining means 703. The receiver 701 comprises a crucial content receiver 7011 and a non-crucial content receiver 7012. The decrypting means 702 comprises crucial content decrypting means 7021 and non-crucial content decrypting means 7022.

The crucial content receiver 7011 is used for receiving crucial content which is sent to a receiver in a protection way that is unique to the receiver. Here, the protection way that is unique to the receiver is the same as that previously described in step 106 with reference to FIG. 1.

The non-crucial content receiver 7012 is used for receiving non-crucial content which is sent to the plurality of receivers in a protection way that is common to the plurality of receivers including the receiver. Here, the protection way that is common to the plurality of receivers is the same as that previously described in step 108 with reference to FIG. 1.

In case that crucial content is protected in an encryption protection way, the crucial content decrypting means 7021 decrypts the received crucial content by using the receiver's specific key. In this case, the content receiving apparatus 700 may further comprise means for obtaining the specific key from the content distributing apparatus (600 in FIG. 6) by using the asymmetric encryption algorithm (not shown in the figure).

In case that crucial content is protected in a channel protection way, the crucial content decrypting means 7021 may not be provided, and the crucial content receiver 7011 receives crucial content on the uni-cast (dedicated) channel established for the receiver.

The non-crucial content decrypting means 7022 is optional, as non-crucial content is not important in comparison with crucial content and does not need to be protected.

In case that non-crucial content is protected in an encryption protection way, the non-crucial content decrypting means 7022 decrypts content received by the non-crucial content receiver 7012, with the common keys for the plurality of receivers including the receiver.

In case that non-crucial content is protected in a channel protection way, the non-crucial content decrypting means 7022 may not be provided, and the non-crucial content receiver 7012 receives non-crucial content on the multicast channel established for the plurality of receivers including the receiver.

The content combining means 703 is used for combining crucial content with non-crucial content as content received by the receiver.

Other parts (not shown in the figure) in the content receiving apparatus 700 can decode, replay or perform other operation on the content output from the content combining means 703, so that the user can experience the received content.

Figure 8:
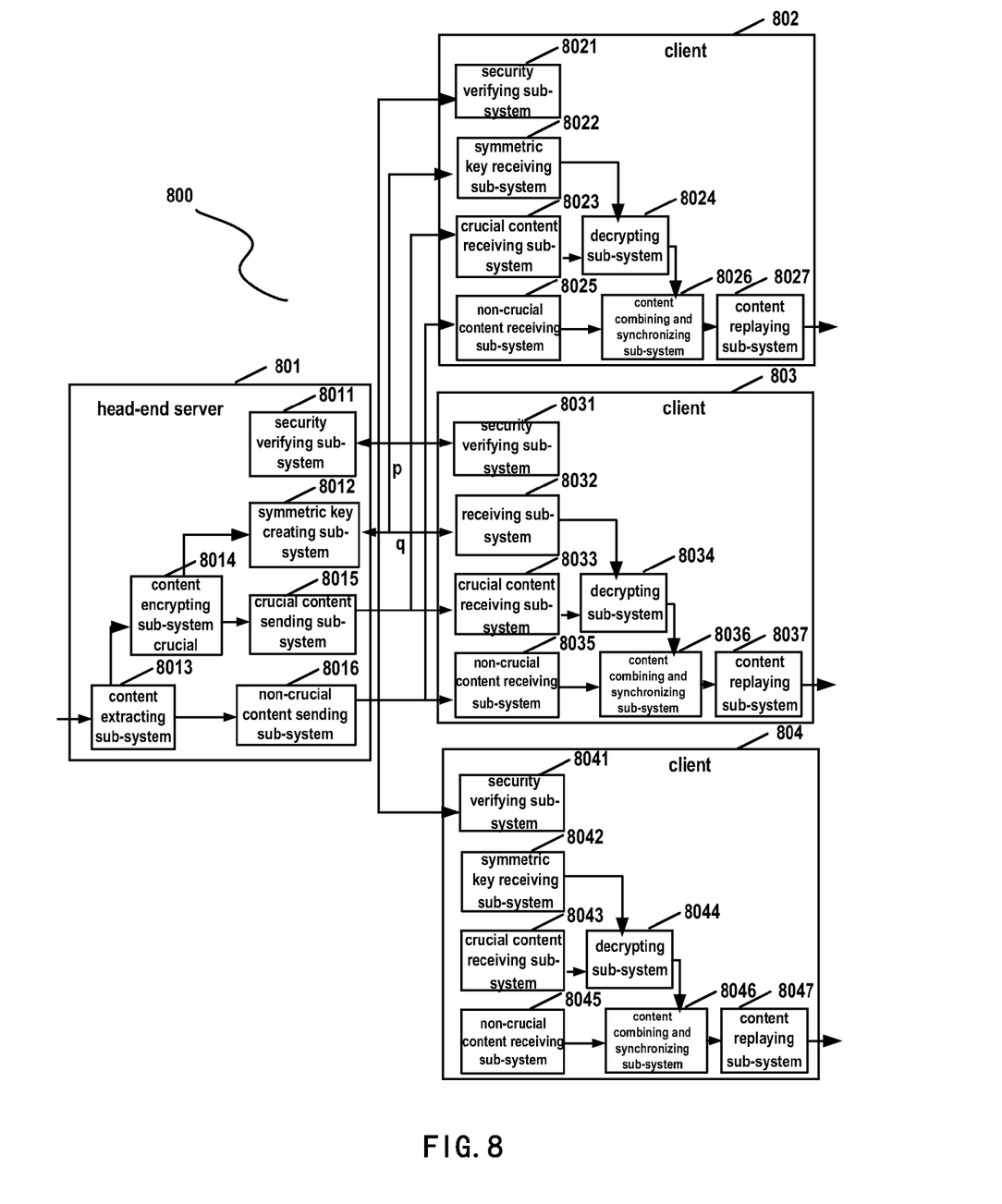
FIG. 8 is a schematic structure of a content distributing system in accordance with an embodiment of the present invention.

FIG. 8 is a schematic structure of a content distributing system according to an embodiment of the present invention.

As shown in FIG. 8, a content distributing system 800 comprises: a head-end server 801 and one client or a plurality of clients 802, 803 and 804.

A security verifying sub-system 8011 in the head-end server 801 first exchanges certificates with security verifying sub-systems 8021, 8031 and 8041 in the respective clients

802, 803 and 804 and then verifies the certificates, to determine authorized clients which are the clients 802 and 803 in the present embodiment.

When the content distributing system 800 applies an encryption (such as symmetric encryption algorithm) protection way to content to be distributed, the asymmetric encryption algorithm may be utilized to transmit specific keys used in the symmetric encryption algorithm to the respective receivers. In this case, the head-end server 801 first creates a specific key p for the authorized client 802 and a specific key q for the authorized client 803 via its internal symmetric key creating system 8012, among which the specific key p is used to symmetrically encrypt the crucial content transmitted to the authorized client 802 and the specific key q is used to symmetrically encrypt the crucial content transmitted to the authorized client 803.

Afterwards, the symmetric key creating system 8012 encrypts the specific key p with the public key in the public-private key pair corresponding to the authorized client 802 and issues it to the authorized client 802, and encrypts the specific key q with the public key in the public-private key pair corresponding to the authorized client 803 and issues it to the authorized client 803.

A symmetric key receiving sub-system 8032 in the authorized client 802 receives the encrypted key p and decrypts it with the private key in its own public-private key pair, to thereby obtain the specific key p for symmetric decryption of the crucial content transmitted to the authorized client 802. Likewise, the authorized client 803 obtains the specific key q for the symmetric decryption of the crucial content transmitted to the authorized client 803.

A content extracting sub-system 8013 in the head-end server 801 obtains content to be distributed and determines crucial content and non-crucial content in the content to be distributed. A criterion for determining crucial content and non-crucial content is the same as that previously described in step 104 with reference to FIG. 1.

A content encrypting sub-system 8014 in the head-end server 801 utilizes the specific key created by the symmetric key creating sub-system 8012 to symmetrically encrypt the crucial content provided by the content extracting sub-system 8013, and a crucial content sending sub-system 8015 sends out the encrypted crucial content. Specifically, the content encrypting sub-system 8014 utilizes the specific key p to symmetrically encrypt the crucial content to be distributed to the authorized client 802, and the crucial content sending sub-system 8015 sends the symmetrically encrypted crucial content to the authorized client 802. Similarly, the content encrypting sub-system 8014 utilizes the specific key q to symmetrically encrypt the crucial content to be distributed to the authorized client 803, and the crucial content sending sub-system 8015 sends the symmetrically encrypted crucial content to the authorized client 803. The above sending to the authorized clients 802 and 803 may be achieved via two uni-cast channels for the authorized clients 802 and 803, respectively, or via the multicast channel for the authorized clients 802 and 803 or via the broadcast channel for all the clients including the authorized client 804. However, since the authorized client 804 does not have a specific key used in the symmetric encryption, the authorized client 804 cannot decrypt or restore the received crucial content. In the least impossible case that the authorized client 804 obtains the private key of the authorized client 802 through malicious attack on the authorized client 802, then the authorized client 804 can only decrypt content sent to the authorized client 802 but can not decrypt content sent to the other authorized client 803.

With regard to the processing on non-crucial content, the content extracting sub-system 8013 may directly deliver non-crucial content to a non-crucial content sending sub-system 8016 which sends out the non-crucial content in plain text form via the multicast or broadcast channel. However, those skilled in the art should understand that in the content sending system of the present embodiment, non-crucial content may also be sent by the non-crucial content sending sub-system 8016 in cipher text after being encrypted.

On the authorized client 803 side, for example, a crucial content receiving sub-system 8033 receives symmetrically encrypted crucial content for the client 803, and a decrypting sub-system 8034 decrypts the crucial content using the specific key q to thereby obtain the crucial content for the client 803. A non-crucial content receiving sub-system 8035 receives non-crucial content in plain text form via the multicast or broadcast channel, and in a content combining and synchronizing sub-system 8036, the non-crucial content is synchronized and combined with the crucial content obtained by the decrypting sub-system 8034 to thereby obtain the restored content in its entirety which can be decoded and replay by a content replay sub-system 8037. However, those skilled in the art should understand that if the non-crucial content is sent in cipher text form after being encrypted, then the client 803 needs to decrypt the received non-crucial content and then synchronize and combine the decrypted non-crucial content with the crucial content. Similarly, the authorized client 802 may also obtain the restored content for its own.

On the other hand, when the content distributing system 800 applies a channel protection way to the content to be distributed, the head-end server 801 may not comprise the symmetric key creating sub-system 8012 and the content encrypting sub-system 8014. The crucial content provided by the content extracting sub-system 8013 may be directly sent out by the crucial content sending sub-system 8015 via the uni-cast channels for the authorized clients. Correspondingly, the clients may also not comprise the symmetric key receiving sub-system 8022, 8032 and the decrypting sub-systems 8024, 8034. The crucial contents which are transmitted in plain text form are received only by the crucial content receiving sub-systems 8023, 8033 from the uni-cast channels and are synchronized and combined with the non-crucial contents which are transmitted in plain text form.

It should be understood that the above non-crucial content may also be transmitted on the uni-cast channel established for each of the authorized clients. This can further improve confidentiality of transmitted content of the system but will increase transmission burden on the whole system and decrease the transmission efficiency.

Though an embodiment of the present invention is explained by taking the head-end server and the clients as an example, those skilled in the art should understand that the present invention may also be conveniently applied to any two devices that call for content transmission, such as ordinary computers or mobile terminals. Moreover, the present invention may be conveniently implemented by computer software programs operating on conventional computers.

As the present invention has been explained with reference to the best embodiments achieving the object of the present invention, it is to be understood to those skilled in the art that various modifications may be made based on these teachings and without departing from the concept and scope of the present invention. For example, the present invention may be implemented using the combination of computer program software, firmware or hardware. As a preparatory step in implementing the present invention or building devices according to the present invention, computer programs codes (software or firmware) according to the present invention may be typically stored on one or more machine-readable storage mediums, such as fixed disc (hard disc) driver, magnetic disc, optical disc, magnetic tape, semiconductor memory like ROM and PROM, and the like, and hence a manufacture article according to the present invention are made. The manufacture article comprises computer program codes which may be directly executed from a storage device, or be copied from the storage device to another storage device like hard disc and RAM for execution, or be sent by the network for remote execution.

As the preferred embodiments of the present invention have been described with reference to the accompanying drawings, those skilled in the art should understand that various formal and detailed alterations can be made without departing from the essence and scope of the present invention. The scope thereof is defined in the appended claims.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A computer-implemented method of distributing content to a plurality of clients, the method comprising:
    accessing a set of encoded content to be distributed to a plurality of clients, wherein the set of encoded content comprises a plurality of independently decodable frames and a plurality of frames that require other frames in order to be decoded;
    identifying a first portion of the set of encoded content to be distributed as a set of crucial content, wherein the set of crucial content is the plurality of independently decodable frames and is required to properly render, after a decryption process, the set of encoded content;
    identifying a second portion of the set of encoded content to be distributed as a set of non-crucial content, wherein the set of non-crucial content is all remaining content in the set of encoded content to be distributed including the plurality of frames that require other frames in order to be decoded;
    encrypting, for each of the plurality of clients, the set of crucial content with a first encryption key that is unique to each of the plurality of clients;
    determining a second encryption key that is common between each client in the plurality of clients;
    encrypting the set of non-crucial content with the second encrypting key that is common between each client in the plurality of clients;
    establishing a multicast channel with the plurality of clients;
    establishing a unicast channel with at least one of the plurality of clients;
    transmitting the encrypted set of crucial content to at least one of the plurality of clients on the unicast channel; and
    transmitting the encrypted set of non-crucial content to each of the plurality of clients on the multicast channel.

2. The method according to claim 1, wherein encrypting the set of crucial content with a first encryption key that is unique to each of the plurality of clients further comprises:
    determining a specific key for each of the plurality of clients by using an asymmetric encryption algorithm.

3. The method according to claim 1, wherein transmitting the encrypted set of crucial content to the plurality of clients further comprises:
    prior to transmitting the non-crucial content transmitting the encrypted set of crucial contact on the unicast channel established for the at least one of the plurality of clients.

4. The method according to claim 1, wherein transmitting the encrypted set of non-crucial content to the plurality of clients further comprises:
    prior to transmitting the encrypted set of crucial content transmitting the encrypted set of non-crucial content on the multicast channel established for the plurality of clients.

5. The method according to claim 1, wherein identifying the first portion of the set of encoded content to be distributed as a set of crucial content further comprises:
    identifying an I frame in an MPEG-4 video code stream as the set of crucial content.

6. The method according to claim 1, wherein identifying the second portion of the set of encoded content to be distributed as the set of non-crucial content further comprises:
    identifying a P frame and B frame in an MPEG-4 video code stream as the set of non-crucial content.

7. The method according to claim 1, wherein identifying the first portion of the set of encoded content to be distributed as the set of crucial content further comprises:
    identifying a partition of class A in an H.264 video code stream, and wherein the identifying the second portion of the set of encoded content to be distributed is a partition of class B and a partition of class C in an H.264 video code stream.

8. A computer-implemented method of receiving content at a client, the method comprising:
    establishing, by a client system, a multicast channel with a content distribution system, wherein the multicast channel is also established between the content distribution system and at least one other client system;
    establishing a unicast channel with the content distribution system;
    receiving an encrypted set of crucial content associated with a set of encoded content on the unicast channel, wherein the set of encoded content comprises a plurality of independently decodable frames and a plurality of frames that require other frames in order to be decoded, the encrypted set of crucial content being encrypted with a first encryption key that is unique to the client system, and wherein the encrypted set of crucial content is the plurality of independently decodable frames and is required to properly render, after a decryption process, the set of encoded content;
    receiving an encrypted set of non-crucial content associated with the set of encoded content on the multicast system, the encrypted set of non-crucial content being encrypted with a second encryption key that is common between the client system and at least one other client system, wherein the set of non-crucial content is all remaining content in the set of encoded content including the plurality of frames that require other frames in order to be decoded;
    decrypting the encrypted set of crucial content with a first decryption key that is unique to the client system to produce the set of crucial content and that corresponds to the first encryption key;
    decrypting the encrypted set of non-crucial content with a second decryption key that is common between the client system and the at least one other client system to produce the set of non-crucial content and that corresponds to the second encryption key; and combining the decrypted set of crucial content with the decrypted set of non-crucial content to form the set of encoded content.

9. The method according to claim 8, wherein receiving the encrypted set of crucial content further comprises:
receiving the first decrypting key from a sender of the encrypted set of crucial content by using an asymmetric encryption algorithm.

10. The method according to claim 8, wherein receiving the encrypted set of crucial content further comprises:
receiving the encrypted set of crucial content on the unicast channel prior to receiving the encrypted set of non-crucial content on the multicast channel.

11. The method according to claim 8, wherein receiving the encrypted set of non-crucial content further comprises:
receiving the encrypted set of non-crucial content on the multicast channel established prior to receiving the encrypted set of crucial content on the unicast channel.

12. The method according to claim 8, wherein receiving encrypted set of crucial content further comprises:
receiving an I frame in an MPEG-4 video code stream.

13. The method according to claim 8, wherein receiving encrypted set of non-crucial content further comprises:
receiving a P frame and a B frame in an MPEG-4 video code stream.

14. The method according to claim 8, wherein receiving encrypted set of crucial content further comprises:
receiving a partition of class A in an H.264 video code stream, and wherein the receiving the non-crucial content is a partition of class B and a partition of class C in the H.264 video code stream.

15. A system to distribute content to a plurality of clients, the system comprising:
at least a processor;
a content extracting sub-system configured to
access a set of encoded content to be distributed to a plurality of clients, wherein the set of encoded content comprises a plurality of independently decodable frames and a plurality of frames that require other frames in order to be decoded; and
identify a first portion of the set of encoded content to be distributed as a set of crucial content and identifying a second portion of the content to be distributed as a set of non-crucial content, wherein the set of crucial content is the plurality of independently decodable frames and is required to properly render, after a decryption process, the set of encoded content, and wherein the set of non-crucial content is all remaining content in the set of encoded content to be distributed including the plurality of frames that require other frames in order to be decoded;

a crucial content encrypting sub-system configured to encrypt, for each of the plurality of clients, the set of crucial content with a first encryption key that is unique to each of the plurality of clients;
a non-crucial content encrypting sub-system configured to encrypt the set of non-crucial content with a second encrypting key that is common between each client in the plurality of clients;
a crucial content sending sub-system configured to
establish a unicast channel with at least one of the plurality of clients; and
transmit the encrypted set of crucial content to the at least one of the plurality of clients on the unicast channel; and
a non-crucial content sending sub-system configured to
establish a multicast channel with the plurality of clients:
transmit the encrypted set of non-crucial content to each of the plurality of clients on the multicast channel.

16. The system according to claim 15, wherein the crucial content encrypting sub-system configured to encrypt the set of crucial content by:
determining a specific key for each of the plurality of clients by using an asymmetric encryption algorithm.

17. The system according to claim 15, wherein the non-crucial content sending sub-system is configured to transmit the encrypted set of non-crucial content system prior on the multicast channel prior to the crucial content sending sub-system transmitting the encrypted set of crucial content on the unicast channel.

18. The system according to claim 15, wherein the content extracting sub-system content is configured to identify the first portion of the set of encoded content to be distributed as a set of crucial content by:
identifying an I frame in an MPEG-4 video code stream as the set of crucial content.

19. The system according to claim 15, wherein the content extracting sub-system content is configured to identify the second portion of the set of encoded content as a set of non-crucial content by:
identifying a P frame and B frame in an MPEG-4 video code stream as the set of non-crucial content.

20. The system according to claim 15, wherein the content extracting sub-system content is configured to identify the first portion of the set of encoded content as a set of crucial content by identifying a partition of class A in an H.264 video code stream, and
wherein the content extracting sub-system content is configured to identify the second portion of the set of encoded content as a set of non-crucial content by identifying a partition of class B and a partition of class C in an H.264 video code stream.

* * * * *